(12) United States Patent
Eidehall et al.

(10) Patent No.: US 9,489,847 B2
(45) Date of Patent: Nov. 8, 2016

(54) METHOD AND ARRANGEMENT FOR DETERMINING A TRAJECTORY

(71) Applicant: VOLVO CAR CORPORATION, Gothenburg (SE)

(72) Inventors: Andreas Eidehall, Molndal (SE); David Madas, Gothenburg (SE)

(73) Assignee: Volvo Car Corporation (SE)

( * ) Notice: Subject to any disclaimer, the term of this patent is extended or adjusted under 35 U.S.C. 154(b) by 72 days.

(21) Appl. No.: 14/153,509

(22) Filed: Jan. 13, 2014

(65) Prior Publication Data
US 2014/0207364 A1 Jul. 24, 2014

(30) Foreign Application Priority Data

Jan. 24, 2013 (EP) .................................... 13152454

(51) Int. Cl.
| | |
|---|---|
| *G08G 1/16* | (2006.01) |
| *G05D 1/02* | (2006.01) |
| *B60W 30/09* | (2012.01) |
| *G01S 17/93* | (2006.01) |
| *B60W 30/095* | (2012.01) |
| *G01S 13/93* | (2006.01) |

(52) U.S. Cl.
CPC .............. *G08G 1/165* (2013.01); *B60W 30/09* (2013.01); *B60W 30/0953* (2013.01); *B60W 30/0956* (2013.01); *G05D 1/024* (2013.01); *G05D 1/0212* (2013.01); *G08G 1/166* (2013.01); *B60W 2550/306* (2013.01); *B60W 2720/12* (2013.01); *B60W 2720/125* (2013.01); *B60W 2750/308* (2013.01); *G01S 13/931* (2013.01); *G01S 17/936* (2013.01); *G05D 2201/0213* (2013.01)

(58) Field of Classification Search
CPC .... G05D 1/0212; G05D 1/024; G08G 1/165; G08G 1/166; B60W 30/09; B60W 30/0953; B60W 30/0956; B60W 2550/306; B60W 2720/12; B60W 2720/125; B60W 2750/308; G01S 13/93; G01S 17/936
USPC ........................................................ 701/301
See application file for complete search history.

(56) References Cited

U.S. PATENT DOCUMENTS

| | | |
|---|---|---|
| 8,401,782 B2 | 3/2013 | Eidehall |
| 2004/0090117 A1 | 5/2004 | Dudeck et al. |
| 2008/0255728 A1 | 10/2008 | Ottenhues et al. |

(Continued)

FOREIGN PATENT DOCUMENTS

| | | |
|---|---|---|
| EP | 2169500 | 3/2010 |
| JP | H07179140 | 7/1995 |

OTHER PUBLICATIONS

Extended European Search Report for EP 13152454.8, Completed by the European Patent Office on Jun. 5, 2013, 7 Pages.

*Primary Examiner* — Aaron L Troost
(74) *Attorney, Agent, or Firm* — Brooks Kushman P.C.

(57) ABSTRACT

A method and an arrangement are provided for determining a trajectory for a host vehicle H in order to as smoothly as possible avoid or mitigate a collision. The arrangement may include a processor and at least one of a sensor system or a communication system. The method may include identifying positions of one or more external objects in relation to the host vehicle H within a predefined distance, generating a plurality of trajectories that are valid for enabling the host vehicle H to pass any desired number of external objects, removing any trajectories intersecting with any one of the external objects, estimating lateral position, lateral velocity, lateral acceleration and the lateral jerk that will act on the host vehicle H driving along any one of the trajectories, and selecting the trajectory for which the lateral jerk acting on the host vehicle H is minimized.

12 Claims, 9 Drawing Sheets

(56) References Cited

U.S. PATENT DOCUMENTS

2010/0076685 A1* 3/2010 Eidehall ............... G01S 13/931
  701/301

2011/0288774 A1* 11/2011 Bengtsson et al. ........... 701/301
2013/0054128 A1* 2/2013 Moshchuk ............. G08G 1/167
  701/301

* cited by examiner

METHOD AND ARRANGEMENT FOR DETERMINING A TRAJECTORY

CROSS-REFERENCE TO RELATED APPLICATIONS

This application claims foreign priority benefits under 35 U.S.C. §119(a)-(d) to European patent application number EP 13152454.8, filed Jan. 24, 2013, which is incorporated herein by reference in its entirety.

TECHNICAL FIELD

Embodiments herein relate to a method and arrangement for determining a trajectory for a vehicle in order to as smoothly as possible avoid or mitigate a collision.

BACKGROUND

Various systems for automatic braking of vehicles are known, where the systems are used in order to avoid or mitigate collisions between a vehicle and other objects, such as other vehicles or obstacles in a road environment.

Many systems are based on a single target approach, i.e., on how much a driver has to brake or steer in order to avoid an object. This is related to the available acceleration in terms of road friction, and may be used to determine when a collision is unavoidable. Ideally, the system only intervenes when the driver needs help.

In systems based on a single target approach, where the threat level for the single most threatening object is evaluated, important aspects may be missed. For example, the combined threat of several objects can be significantly higher than the individual threat of all objects if they are considered separately. For a general traffic situation with multiple objects present, a multi-target threat assessment may be advantageous, but it is difficult to find the required acceleration to avoid a collision.

EP2169500A1 discloses a method of assessing vehicle paths in a road environment including a host vehicle and external objects. The method is including the steps of detecting external objects by a sensor system and generating a plurality of paths passing said external objects. The method of EP2169500A1 describes a search tree method, and uses piecewise constant lateral acceleration for the description of the lateral motion of a vehicle travelling the paths. Although this approximation may be sufficient when used for threat assessment in auto brake systems, it may be insufficient as a base for lateral control of the vehicle since the lateral acceleration cannot change instantly.

SUMMARY

Embodiments herein aim to provide an improved method for determine a trajectory for a host vehicle in order to as smoothly as possible avoid or mitigate a collision.

This is provided through a method for determining a trajectory for a host vehicle in order to as smoothly as possible avoid or mitigate a collision in a road environment including the host vehicle and external objects, using an arrangement comprising processing means and at least one of a sensor system or a communication system, where the method includes the steps of identifying the positions of one or more external objects in relation to the host vehicle within a predefined distance using at least one of the sensor or communication systems, generating a plurality of trajectories that are valid for enabling the host vehicle to pass any desired number of external objects using the processing means, removing any trajectories intersecting with any one of the external objects using the processing means, estimating lateral position, lateral velocity, lateral acceleration and the lateral jerk that will act on the host vehicle driving along any one of the trajectories, using the processing means and selecting the trajectory for which the lateral jerk acting on the host vehicle is minimized, using the processing means.

Since the lateral jerk represents the change of the lateral acceleration, minimized lateral jerk results in a smooth escape trajectory for a vehicle driving along the trajectory, and a driver or passengers will perceive the escape trajectory to be relatively comfortable in comparison with other potential escape trajectories.

According to a second aspect this is provided through a method for determining a trajectory in which a safety distance is preselected between any external objects and the host vehicle when selecting the trajectory.

Since a preselected safety distance is introduced between the host vehicle and any external object, the host vehicle may pass any external object without touching them. This may be advantageous since no damage occurs due to contact between the host vehicle and any external objects.

According to a third aspect this is provided through a method for determining a trajectory in which the selected trajectory forms a tangent to a first point located at a preselected safety distance from a first external object.

Since the selected trajectory forms a tangent to a first point located at a preselected safety distance from a first external object, the selected trajectory passes the first external object as close as desired, and the jerk acting on a vehicle driving along the selected trajectory may be minimized at the same time as a preselected safety distance is present between the host vehicle and a first external object.

According to a fourth aspect this is provided through a method for determining a trajectory in which the selected trajectory forms a tangent to a first point located at a preselected safety distance from a first external object and at least another point located at a preselected safety distance from at least another external object.

Since the selected trajectory forms a tangent to a first point located at a preselected safety distance from a first external object and at least another point located at a preselected safety distance from at least another external object, the selected trajectory passes the first and the at least one other external object as close as desired, and the jerk acting on a vehicle driving along the selected trajectory may be minimized at the same time as a preselected safety distance is present between the host vehicle the external objects.

According to a fifth aspect this is provided through a method for determining a trajectory in which the trajectory is constituted of n spline segments of degree d, and that the n spline segments are divided by spline breakpoints.

Since the trajectory is constituted of spline segments divided by spline breakpoints, different expressions and equations may be used to describe different spline segments. This may be useful to define or express the lateral position, velocity, acceleration and jerk level.

According to a sixth aspect this is provided through a method for determining a trajectory in which the trajectory is constituted of n polynomial spline segments of degree d, and that the n spline segments are divided by spline breakpoints.

Since the trajectory is constituted of polynomial spline segments divided by spline breakpoints, different expressions and equations may be used to describe different spline segments. Describing the spline with a polynomial may be useful to define or express the lateral position, velocity, acceleration and jerk level.

According to a seventh aspect this is provided through a method for determining a trajectory in which the spline breakpoints are selected independently from the positions of the external objects by the processing means, and that the selection is based on the estimated amount of lateral jerk that would act on the host vehicle if driven along any one of the trajectories.

Since the spline breakpoints are selected independently from the positions of the external objects, and that the selection is based on the estimated amount of lateral jerk that would act on the host vehicle if driven along any one of the trajectories, different expressions and equations may be used to describe and/or select a jerk level in a spline segment, and the jerk level in different spline segments of the trajectory may be compared.

According to an eight aspect this is provided through a method for determining a trajectory in which the spline breakpoints are selected such that the estimated maximum jerk for each spline segment is substantially equal.

Since the spline breakpoints are selected such that the estimated maximum jerk for each spline segment is substantially equal, the maximal jerk in each segment of the spline may be utilized, and the total jerk level may be kept as low as possible and the trajectory as smooth as possible.

Further embodiments herein aim to provide an improved arrangement for determining a trajectory for a vehicle in order to as smoothly as possible avoid or mitigate a collision.

This is provided through an arrangement for determining a trajectory for a host vehicle in order to as smoothly as possible avoid or mitigate a collision in a road environment including the host vehicle and external objects, where the arrangement comprises processing means and at least one of a sensor system or a communication system and is arranged to execute the steps of identifying the positions of one or more external objects in relation to the host vehicle within a predefined distance using at least one of the sensor or communication system, generating a plurality of trajectories that are valid for enabling the host vehicle to pass any desired number of external objects using the processing means, removing any trajectories intersecting with any one of the external objects using the processing means, estimating lateral position, lateral velocity, lateral acceleration and the lateral jerk that will act on the host vehicle driving along any one of the trajectories, using the processing means and selecting the trajectory for which the lateral jerk acting on the host vehicle is minimized, using the processing means.

Since the lateral jerk represents the change of the lateral acceleration, minimized lateral jerk results in a smooth escape trajectory for a vehicle traveling along the trajectory, and a driver or passengers will perceive the escape trajectory selected by the arrangement described above to be relatively comfortable in comparison with any other potential escape trajectory.

Further features of, and advantages will become apparent when studying the appended claims and the following detailed description. Those skilled in the art will realize that different features may be combined to create embodiments other than those described in the following, without departing from the scope hereof, as defined by the appended claims.

BRIEF DESCRIPTION OF THE DRAWINGS

The various aspects of embodiments herein, including their particular features and advantages, will be readily understood from the following detailed description and the accompanying drawings, in which.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
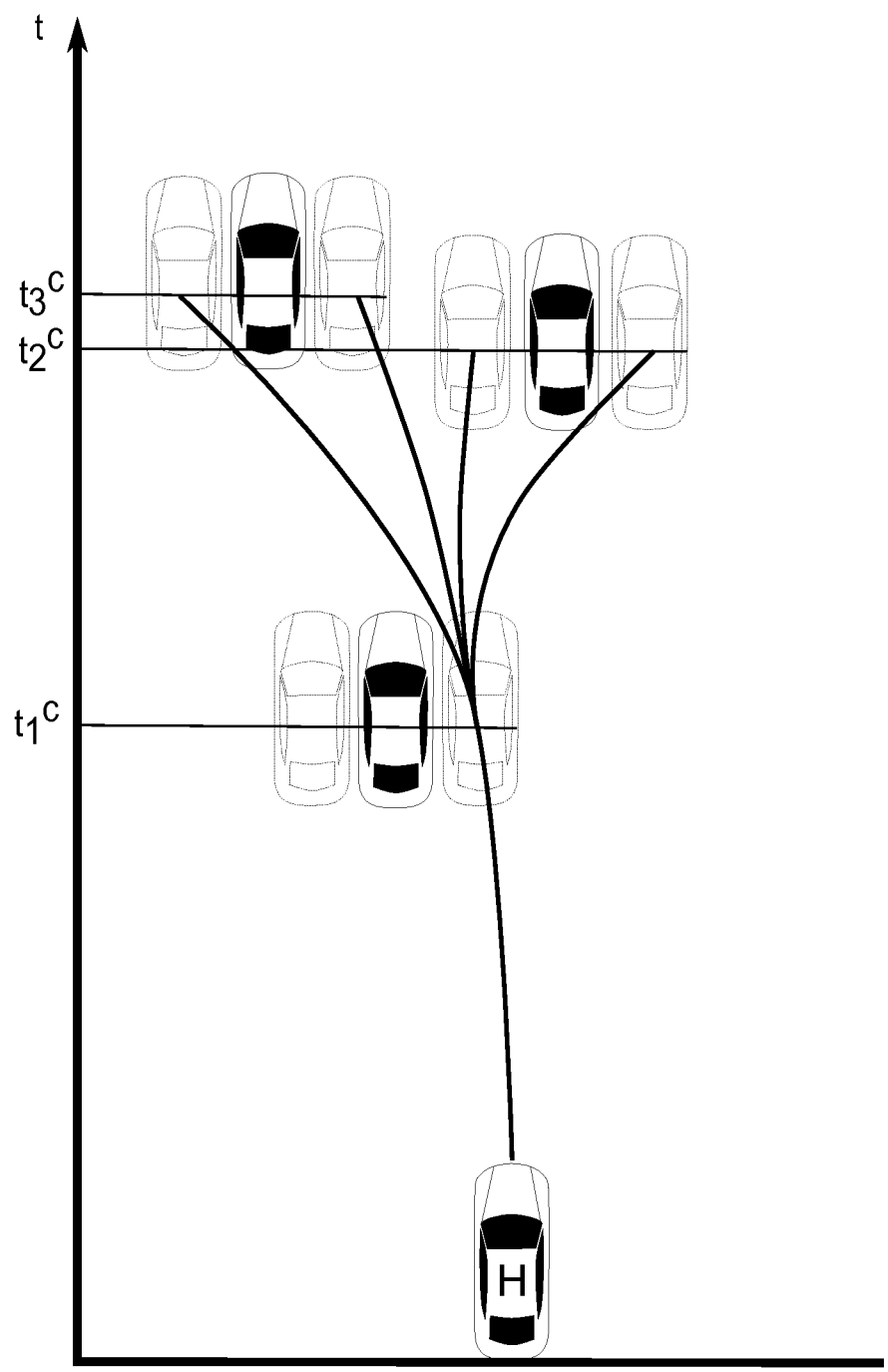
FIG. 1 illustrates vehicles in a road environment.

FIG. 1 illustrates trajectories generated by a prior-art search tree method, in which a road environment with a moving host vehicle H approaches stationary or slower moving objects in form of vehicles. In order to avoid or mitigate a collision between the host vehicle H and any of the objects in front of the host vehicle H, more than one object is taken into account, and the goal is to find a steering manoeuver that simultaneously avoid several objects. As seen in the example, according to FIG. 1, the host vehicle H has to avoid collision with three objects ahead. The goal of the method is to find, for each given traffic scenario, the "easiest" escape trajectory in some respect, and then use the severity or harshness of this escape trajectory as a threat metric. The method is based on the assumption that an optimal trajectory will always be straight forward, or it will touch as least one object. This method uses a search tree to generate trajectories with piecewise constant lateral acceleration that tangents all combinations of objects, and the acceleration is allowed to change only at the points in time $(t_1^c, t_2^c, t_3^c)$ where an object is passed. Among the collision-free escape trajectories that are found, the one with the lowest lateral acceleration is selected as the optimal escape trajectory.

A problem with the search tree model is that the steering manoeuver consists of piecewise lateral constant acceleration. Piecewise lateral constant acceleration is sufficient for assessing the threat in some automatic emergency braking applications, but may be unrealistic for controlling the vehicle. The vehicle may not be controlled according to such a steering manoeuvre as the lateral acceleration cannot change instantly.

Another problem with the search tree model is that the acceleration only is allowed to change at points in time ($t_1^c$, $t_2^c$, $t_3^c$) when an object is passed, which may result in a non-smooth escape path.

Figure 2:
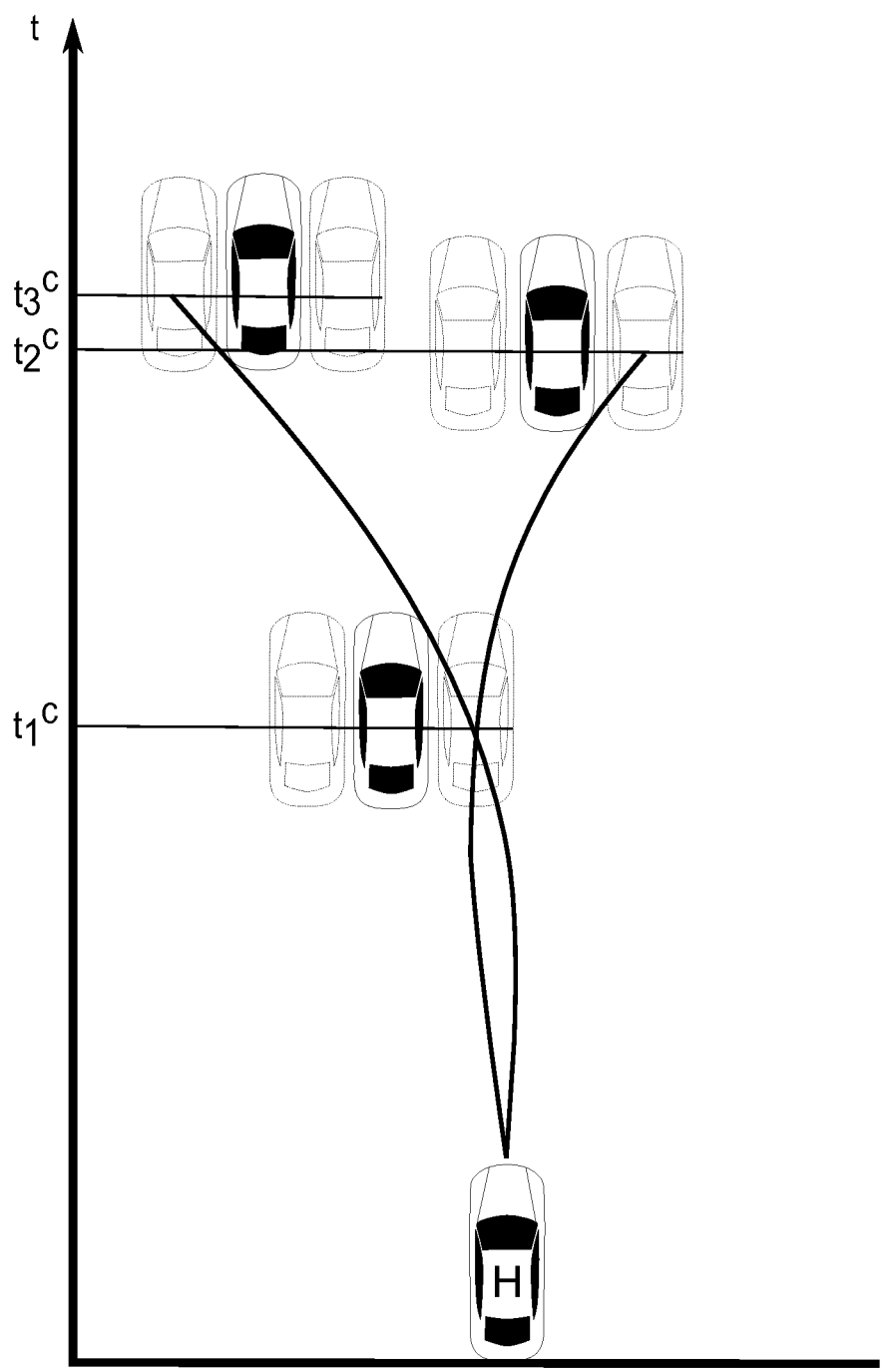
FIG. 2 illustrates vehicles in a road environment.

In FIG. 2 trajectories based on smooth splines are illustrated. The method for determining a trajectory illustrated in FIG. 2 considers several objects simultaneously, and applies a smooth type of curve based on splines, such as polynomial splines. The method is similar to the method illustrated in FIG. 1 in that it goes through all possible manoeuvers that touch combinations of objects on a left hand side or a right hand side, but according to this method a smooth spline is used to describe the trajectory. Left hand side or on a right hand side of an object is here defined as the objects are seen by a person sitting in the host vehicle, looking at the objects in front of the host vehicle. Referring to FIG. 1 or 2, a road may have an extension substantially vertical in the figures, in parallel with a longitudinal direction of the host vehicle H. In FIG. 2, two trajectories for the host vehicle H are illustrated. A host vehicle H that is driven along the any one of the two trajectories is thus passing a first object at $t_1^c$ on a right hand side, illustrated by the trajectories on a right hand side of the object at $t_1^c$. Then one of the trajectories passes a second object on a right hand side at $t_2^c$, the other trajectory is passing a third object at $t_3^c$ on a left hand side. The trajectories illustrate examples of possible trajectories.

As seen when comparing FIG. 1 and FIG. 2, the first part of the trajectory between the host vehicle H and the first object at $t_1^c$ is different, since the first part of the trajectory depends on the second part of the trajectory between $t_1^c$ and $t_2^c$. In order to achieve this, all objects along the trajectory have to be considered at the same time when generating the trajectory.

The splines constituting the trajectories according to FIG. 2 fulfil two requirements; they can be found quickly, which is important for implementations where the method is arranged to be used in real time applications, and they are smooth enough to be able to control a vehicle in a comfortable manner.

Figure 3:
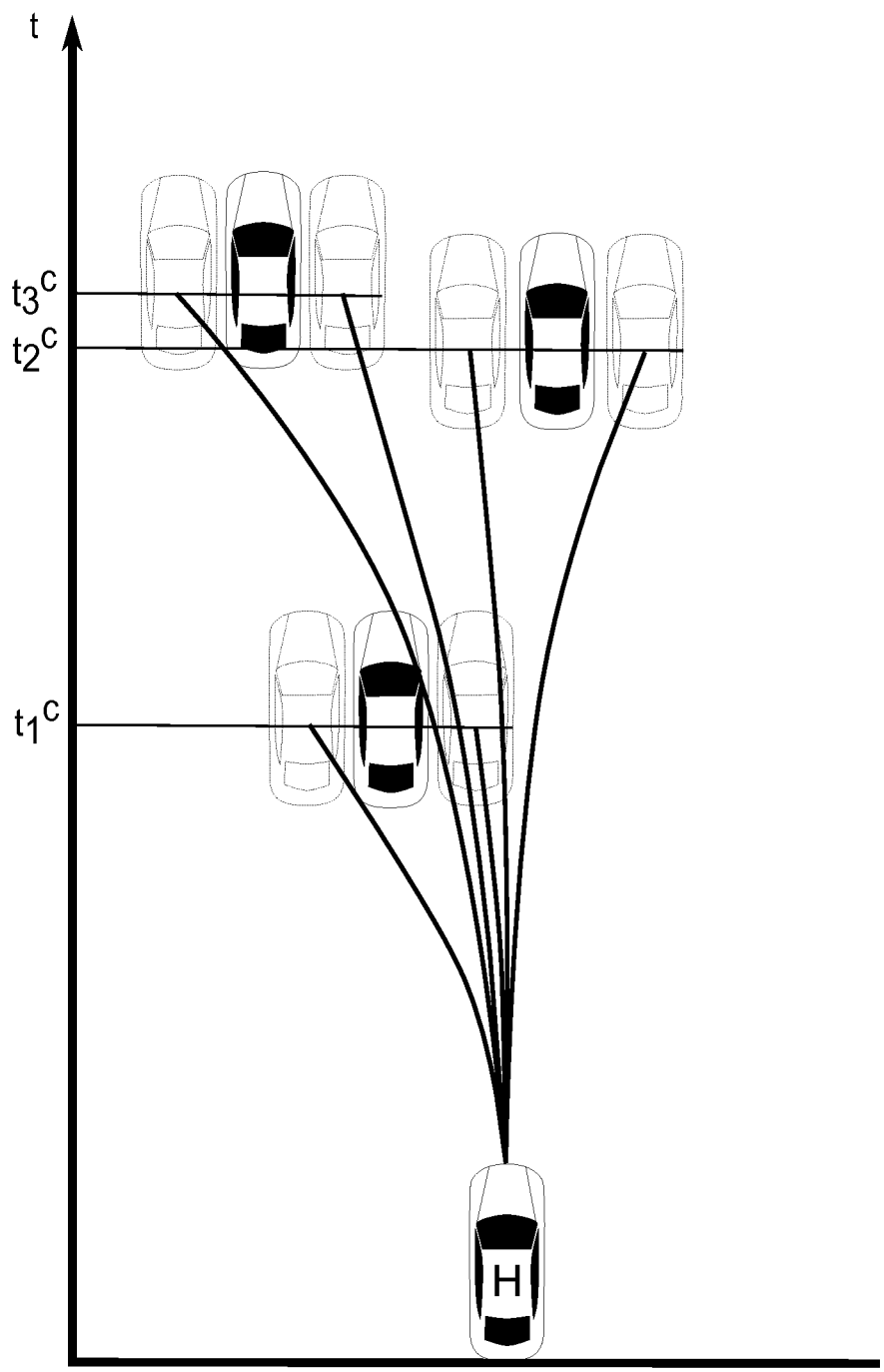
FIG. 3 illustrates vehicles in a road environment.

In FIG. 3 it is illustrated how trajectories for all manoeuvers that only consider a first single object are found. Both passing on a left hand side and passing on a right hand side is considered. Several of the trajectories involve conflicts with other objects but they will be removed in a later step.

Then manoeuvers considering two objects are found, as illustrated in FIG. 2. All combinations of objects ordered in time are considered. In FIG. 2 only two examples are illustrated for the sake of clarity. Then manoeuvers considering three objects are found. The method may be carried out until the desired number of complexity has been reached. Thus, trajectories that forms a tangent to one object, two objects, three objects . . . n objects are generated, until a required search depth is reached. Then candidate manoeuvers are evaluated and the ones intersecting with objects are removed. All remaining manoeuvers are valid escape trajectories, and the optimal one is the one with the lowest jerk.

Figure 4:
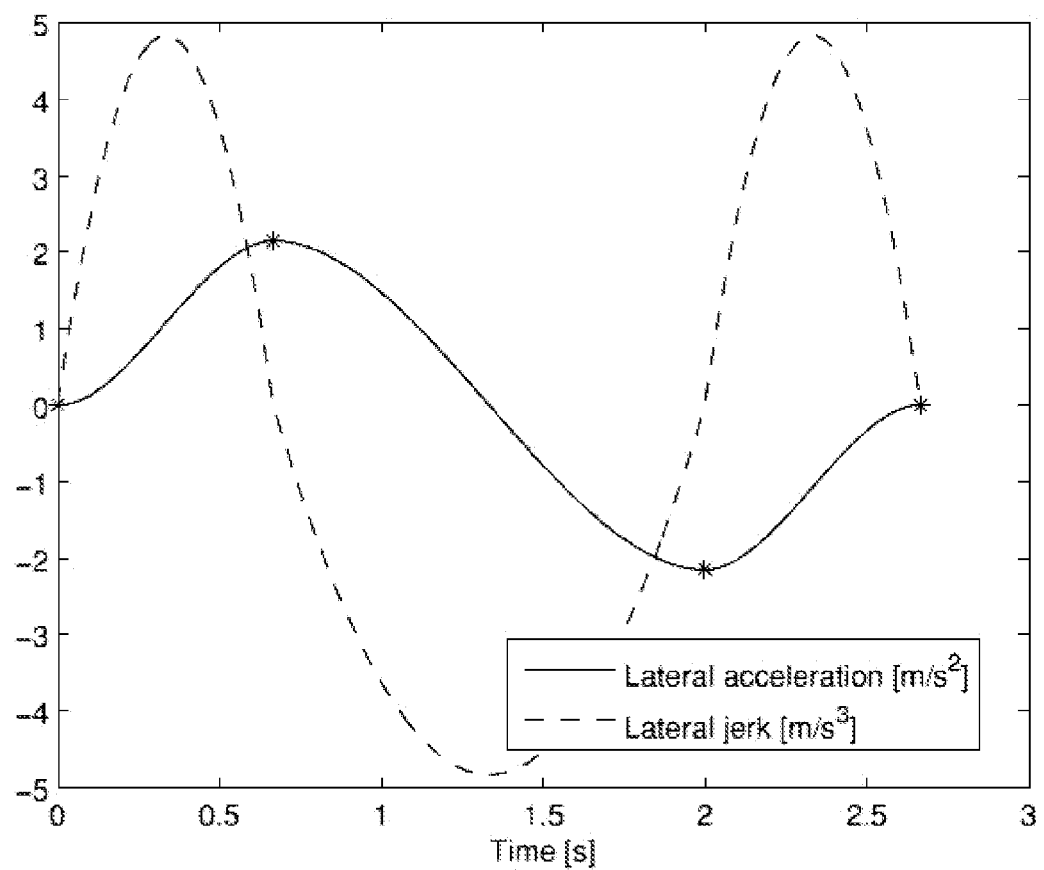
FIG. 4 illustrates a graph of lateral acceleration and jerk.

The trajectories are smooth enough thanks to a high level of differentiability. The splines according to FIG. 2 may be piecewise cubic splines in acceleration, and the acceleration level is illustrated in FIG. 4. The acceleration may be a cubic polynomial spline with zero derivatives at the knots. The number of knots and their position depends on the problem that needs to be solved and its complexity. It has the advantage of being relatively easy to find, i.e. has low numerical complexity, and it is sufficiently smooth.

FIG. 4 also illustrates the jerk level. The jerk represents the change level in acceleration, and in order to keep the manoeuver comfortable is it important to keep the jerk level as low and smooth as possible. Since the goal is to keep the jerk low, the method according to the subject matter as defined in the appending claims may utilize the maximal jerk $J_{max}$ in each segment of the spline. The manoeuver may be parameterized by the expression $$M=(J_{max},T) \text{ where } T=\{t_1,t_2,t_3, \ldots t_i\}$$

$J_{max}$ represents the peak magnitude of the jerk, which is the same in all segments of the spline, and $t_1$ is the length of the Segment 1 of the spline, $t_2$ is the length of the segment 2 of the spline, i.e. $t_i$ is the length of the segment i of the spline.

The jerk level along the trajectory in a three segment spline may be expressed a $$J(t) = \begin{cases} -4J_{max}t(t-t_1)/t_1^2 & \text{if } t \leq t_1 \\ 4J_{max}(t-t_2)(t-t_1)/(t_2-t_1)^2 & \text{if } t_1 < t \leq t_2 \\ -4J_{max}(t-t_2)(t-t_3)/(t_2-t_3)^2 & \text{if } t_2 < t \end{cases}$$

and expressions for the lateral acceleration, lateral velocity and lateral position along the trajectory may be found by integrating the expression J(t) above. The method may be combined with other types of curves as well, for example splines with lower order.

The jerk level may be selected as cost function, and the optimal trajectory will then either be of zero jerk or the trajectory will touch at least one of the object. In order to find the optimal manoeuver, all manoeuvers that touch different combinations of objects have to be searched.

Figure 10:
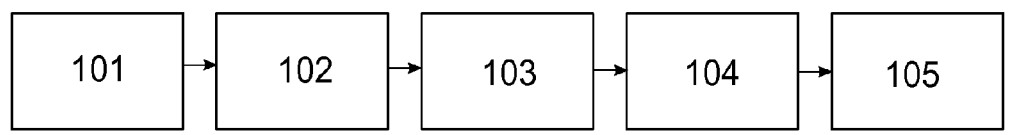
FIG. 10 illustrates method steps.

The method for determining a trajectory for a host vehicle H in order to as smoothly as possible avoid or mitigate a collision in a road environment including the host vehicle H and external objects is using an arrangement comprising processing means 1 and at least one of a sensor system 2 or a communication system 3. The method is illustrated in FIG. 10 and includes the steps of identifying 101 the positions of one or more external objects in relation to the host vehicle H within a predefined distance within a sensor covered area, using at least one of the sensor or communication systems 2, 3, generating 102 a plurality of trajectories that are valid for enabling the host vehicle H to pass any desired number of external objects using the processing means 1, removing 103 any trajectories intersecting with any one of the external objects using the processing means 1, estimating 104 lateral position, lateral velocity, lateral acceleration and the lateral jerk that will act on the host vehicle H driving along any one of the trajectories, using the processing means 1 and selecting 105 the trajectory for which the lateral jerk acting on the host vehicle H is minimized, using the processing means 1.

Figure 9:
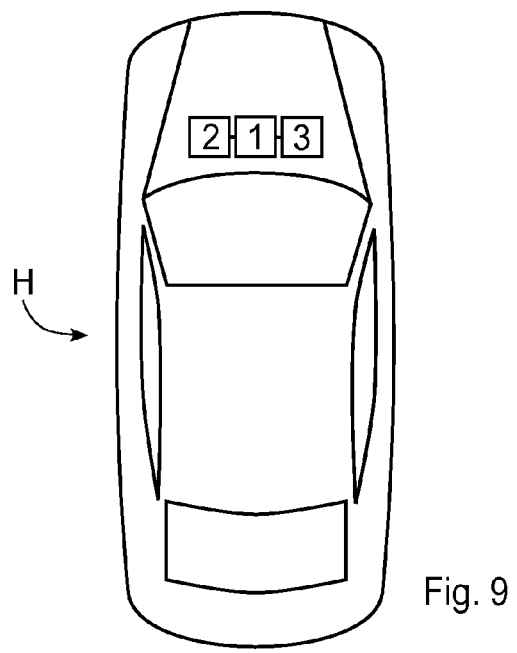
FIG. 9 illustrates a vehicle.

Identification of the positions of the one or more external objects may be done by a sensor system 2. The sensor system 2 may use radar (the determination of for example direction or speed of objects with radio waves), lidar (where light, such as laser, is used for sensing e.g. direction or speed of objects), cameras, global positioning systems etc. or combinations of these for identifying the positions of the external objects. The external objects may also be identified by other vehicles or sensing systems of any kind, which in turn communicates information relating to the external objects to the host vehicle communication system 3. An example of this is vehicle-to-vehicle communication systems, where information may be sent or forwarded between vehicles. The communication system 3 can use for example radio communication, telecommunication and/or optical communication. The sensor system 2 and the communication system 3 are illustrated in FIG. 9.

The processing means 1 comprises one or more processors with associated software and one or more memory units in communication with the one or more processors such that the processing means 1, upon execution of the associated software on the one or more processors, may generate, select and remove trajectories. The processing means 1 is further arranged to estimate lateral position, lateral velocity, lateral acceleration and lateral jerk that may act on the host vehicle H.

The method is extremely fast and may be run in real time in automotive hardware. The trajectory that is found is the global optimum in the given function class. In order to estimate the numerical complexity, the number of manoeuvers that have to be computed may be expressed as $$S_{N,Nmax} \sum_{n=1}^{Nmax} 2^n \binom{N}{n}$$

where N is the total number of objects and $N_{max}$ is the maximum number of objects that are considered simultaneously in each manoeuver. The present implementation may be restricted such that a single manoeuver considers at most two objects in each candidate manoeuver, i.e. $N_{max}=2$. The removal of any trajectories intersecting with any one of the external objects is done on all objects. If $N_{max}=2$ then the SN, $N_{max}$ expression may be reduced to $S_{N,2}=2N^2$.

Figure 5:
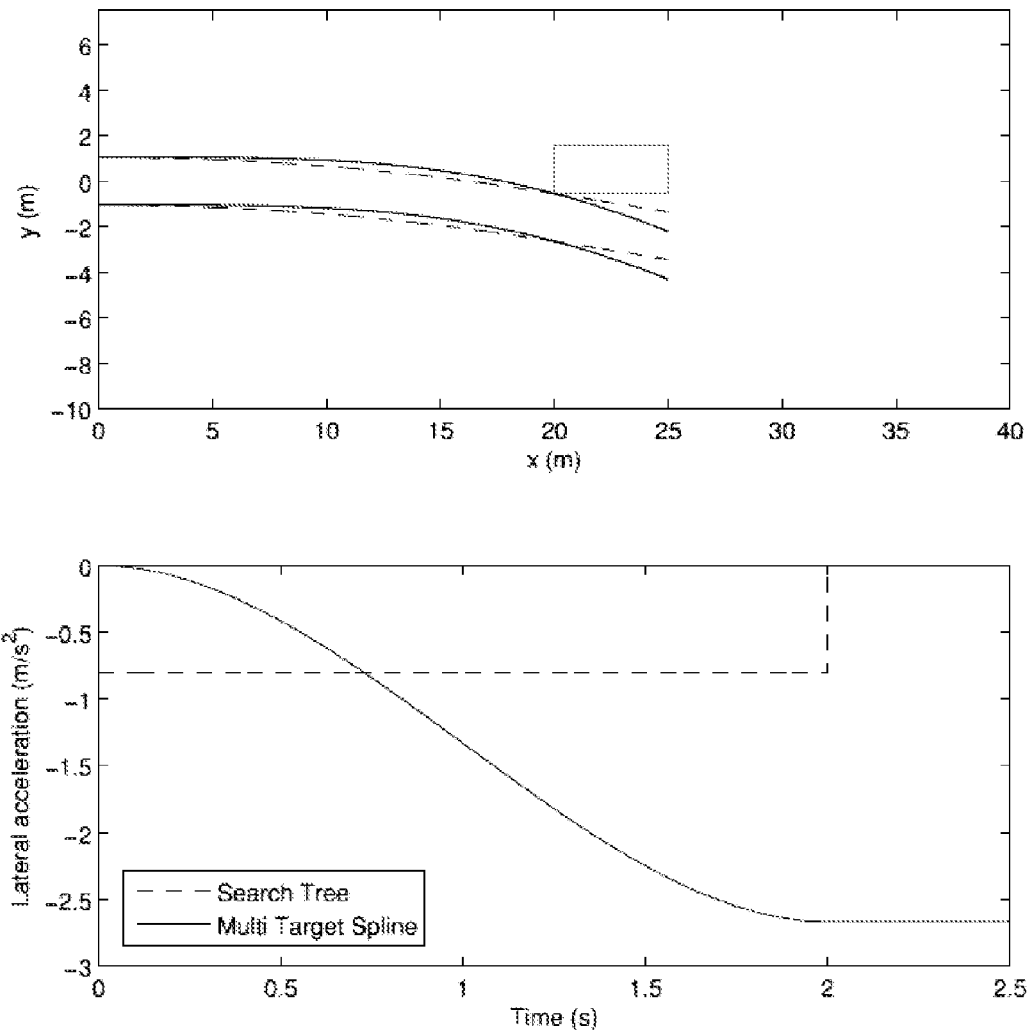
FIG. 5 illustrates graphs of lateral position and acceleration.

In FIG. 5, the trajectories and corresponding lateral acceleration profiles (solid lines) are compared with the trajectories and corresponding lateral acceleration profiles according to the abovementioned search tree method with constant lateral acceleration (dashed lines). In the figure, the centre of the front of the host vehicle H is at the origin, and the host vehicle H is travelling in the positive x-direction. The host vehicle H is thus not visible in the graphs, only its trajectory. The trajectory is shown as a corridor which represents the area used by the host vehicle H during the manoeuver. The trajectory may pass the obstacles with a predefined safety distance, and the desired safety distance may be added before running the escape trajectory algorithm. Depending on the traffic situation, the obstacles, the host vehicle H etc., the safety distance may be selected to be very small, such as one or a few millimeters, or it may be larger, such as one of a few centimeters, decimeters or meters. In dense traffic, or traffic situations in which the host vehicle H and/or the surrounding obstacles/vehicles have relatively low velocity, a smaller safety distances may be preferred. In other situations it may be preferable to select larger safety distances when possible.

In FIG. 5, a scenario in which a host vehicle H approaches a single stationery vehicle is illustrated. The dashed line represents the search tree constant acceleration method, which is used as reference, while the solid line represents the spline based trajectory according to embodiments herein. The underlying motion assumption is apparent in the lower plot. In the search tree method, the acceleration instantly changes and switches back to zero after passing the object. The multiple object/target spline method uses a continuous jerk, which means a smooth lateral acceleration.

Even if the search tree method sometimes may produce manoeuvres with lower lateral acceleration, they may be unrealistic from a vehicle dynamics perspective. Even if a lateral controller of a vehicle would use such a manoeuver as reference, the vehicle may not be able to follow it.

Figure 6:
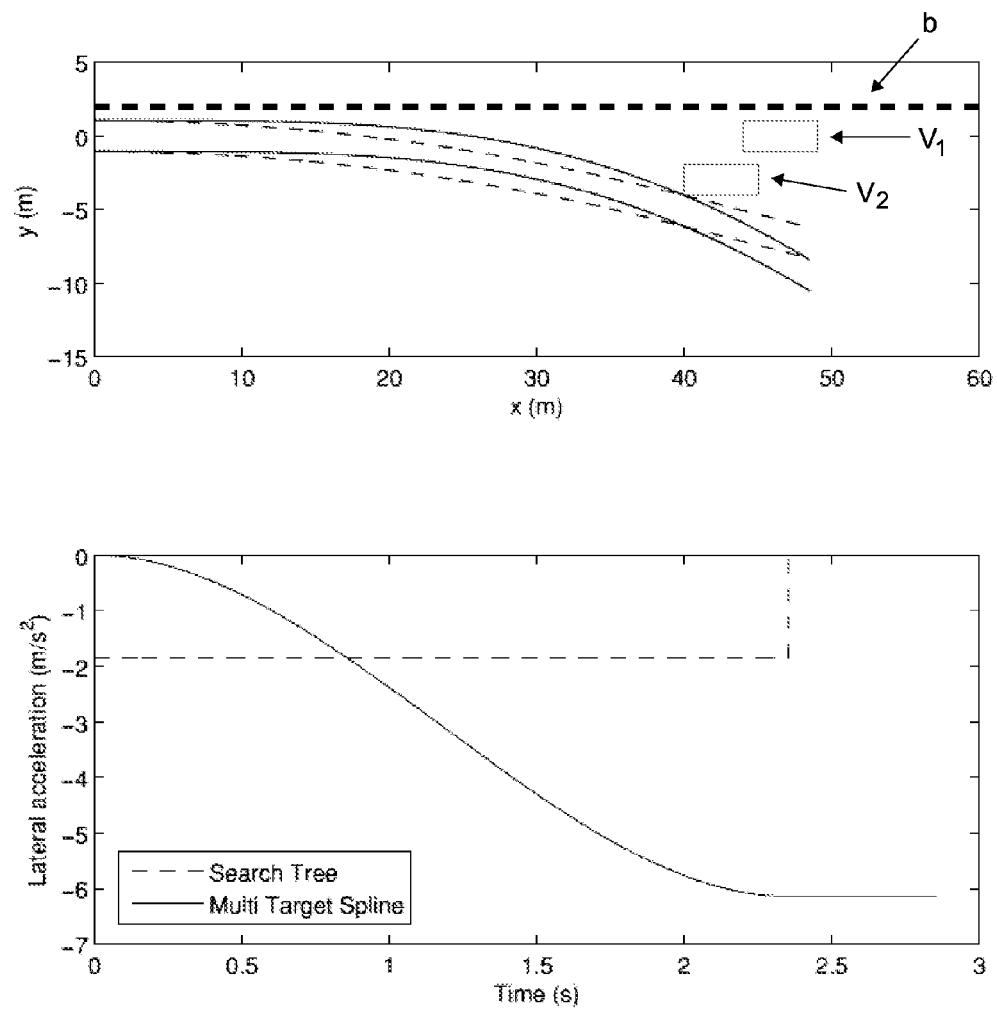
FIG. 6 illustrates graphs of lateral position and acceleration.
Figure 7:
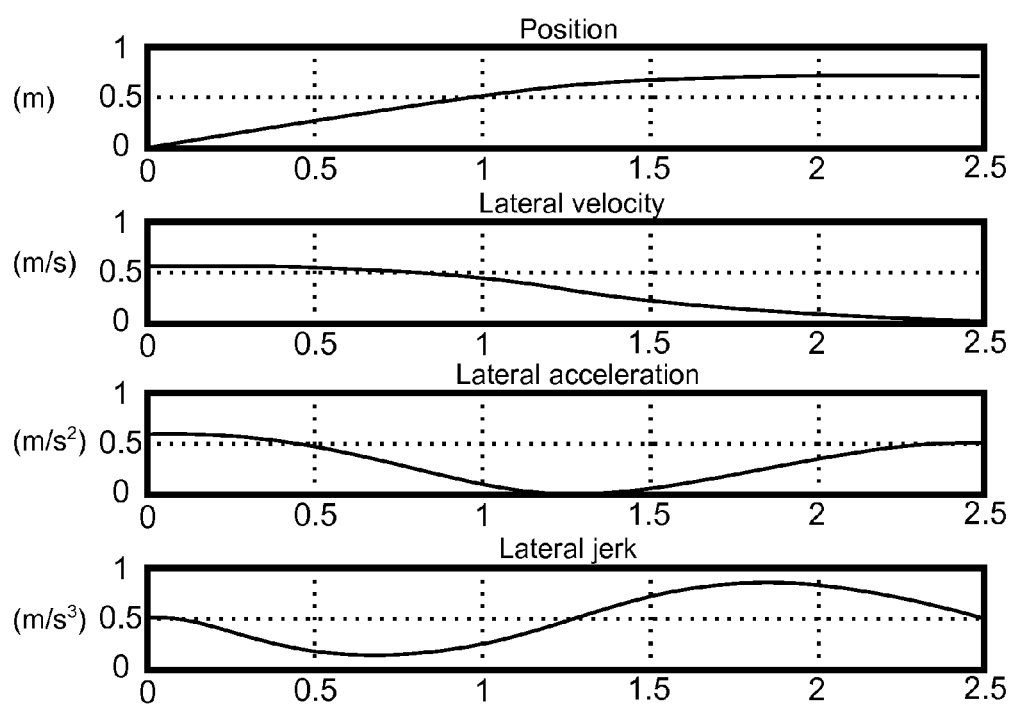
FIG. 7 illustrates the relation between position, velocity, acceleration and jerk.

Also in FIG. 6, the trajectories and corresponding lateral acceleration profiles are compared with the trajectories and corresponding lateral acceleration profiles according to the abovementioned search tree method with constant lateral acceleration. In the figure, the centre of the front of the host vehicle H is at the origin, and the host vehicle H is travelling in the positive x-direction. The host vehicle H is thus not visible in the graphs, only its trajectory. The trajectory is shown as a corridor which represents the area used by the host vehicle H during the maneuver. A scenario in which a host vehicle H approaches two objects in form of vehicles $V_1$, $V_2$ is illustrated. In addition to the objects in form of vehicles $V_1$, $V_2$ an object in form of a barrier b along the road is illustrated with heavy dashed lines. The figure illustrates that if all objects are taken into account, the threat level will be much higher than if just one object is considered at a time. This means for example that autonomous emergency braking activations may be initiated earlier. In FIG. 7, the relation between the position, the lateral velocity, the lateral acceleration, and the lateral jerk is illustrated.

Figure 8:
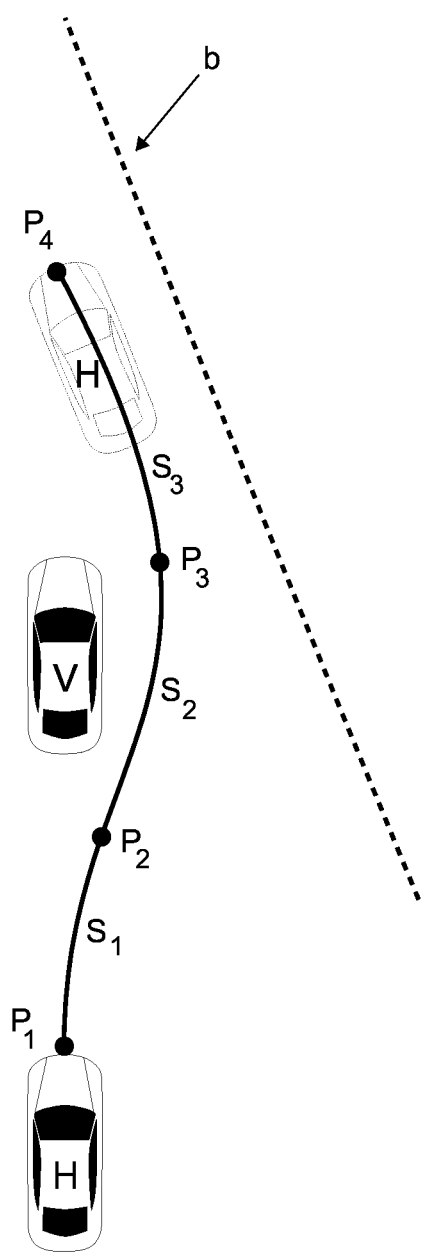
FIG. 8 illustrates vehicles in a road environment.

In FIG. 8, a scenario in which a host vehicle H approaches a vehicle V and a barrier b is illustrated. The aim for the host vehicle H is to, as smoothly as possible, avoid or mitigate a collision with another vehicle and a barrier. The positions of the external objects are identified by sensor systems or are communicated to the host vehicle H. A plurality of trajectories that are valid for enabling the host vehicle H to pass the external objects are generated, and any trajectories intersecting with any one of the external objects are removed. The lateral position, lateral velocity, lateral acceleration and the lateral jerk that will act on the host vehicle H driving along any one of the trajectories are estimated, and the trajectory for which the lateral jerk acting on a host vehicle H is minimized is selected as the escape trajectory. The escape trajectory is illustrated in FIG. 8. In the embodiment according to the figure, the escape trajectory consists of three spline segments $S_1$, $S_2$, $S_3$ divided by spline breakpoints $P_1$, $P_2$, $P_3$, $P_4$ illustrated as dots along the trajectory. As seen, a first spline breakpoint $P_1$ is present in the starting point of the first spline segment $S_1$, and a last spline breakpoint $P_4$ is present at the end of the last spline segment $S_3$, as seen from the host vehicle H. The spline breakpoints $P_1$, $P_2$, $P_3$, $P_4$ are selected independently from the external objects in form of a vehicle V and a barrier b, such that the total jerk level acting on the host vehicle H is minimized.

In FIG. 9 the host vehicle H, the processing means 1, the sensor system 2 and the communication system 3 are illustrated.

FIG. 10 illustrates a method for determining a trajectory for a host vehicle H in order to as smoothly as possible avoid or mitigate a collision in a road environment including the host vehicle H and external objects, using an arrangement comprising processing means and at least one of a sensor system or a communication system, wherein the method including the steps of identifying 101 the positions of one or more external objects in relation to the host vehicle H within a predefined distance using at least one of the sensor or communication systems, generating 102 a plurality of trajectories that are valid for enabling the host vehicle H to pass any desired number of external objects using the processing means, removing 103 any trajectories intersecting with any one of the external objects using the processing means, estimating 104 lateral position, lateral velocity, lateral acceleration and the lateral jerk that will act on the host vehicle H driving along any one of the trajectories, using the processing means, selecting 105 the trajectory for which the lateral jerk acting on the host vehicle H is minimized, using the processing means Example embodiments described above may be combined as understood by a person skilled in the art. It is also understood by those skilled in the art that the splines are not restricted to be polynomial splines, but may be expressed in any suitable form.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for determining a trajectory for a host vehicle H in order to as smoothly as possible avoid or mitigate a collision in a road environment including the host vehicle H and one or more external objects, the method comprising:
   identifying a position or positions of one or more external objects in relation to the host vehicle H within a predefined distance using at least one of a sensor system or a communication system;
   generating a plurality of trajectories that are valid for enabling the host vehicle H to pass any desired number of the one or more external objects using a processing means;
   removing any trajectories intersecting with any one of the one or more external objects using the processing means;
   estimating lateral position, lateral velocity, lateral acceleration and lateral jerk that will act on the host vehicle H driving along any one of the trajectories, using the processing means; and
   selecting the trajectory for which the lateral jerk acting on the host vehicle H is minimized, using the processing means;
   wherein the trajectory comprises n spline segments of degree d, and the n spline segment are divided by spline breakpoints, the spline breakpoints selected independently from the position of the external objects by the processing means such that an estimated total amount of lateral jerk that would act on the host vehicle H is minimized.

2. The method for determining a trajectory according to claim 1 wherein a safety distance is preselected between any external objects and the host vehicle H when selecting the trajectory.

3. The method for determining a trajectory according to claim 2 wherein the selected trajectory forms a tangent to a first point located at a preselected safety distance from a first external object.

4. The method for determining a trajectory according to claim 2 wherein the selected trajectory forms a tangent to a first point located at a first preselected safety distance from a first external object and at least another point located at a second preselected safety distance from at least another external object.

5. The method for determining a trajectory according to claim 1 wherein the trajectory is constituted of n polynomial spline segments of degree d, and that the n spline segments are divided by spline breakpoints.

6. The method for determining a trajectory according to claim 1 wherein the spline breakpoints are selected such that an estimated maximum jerk, $J_{max}$, for each spline segment is substantially equal.

7. An arrangement for determining a trajectory for a host vehicle H in order to as smoothly as possible avoid or mitigate a collision in a road environment including the host vehicle H and one or more external objects, the arrangement comprising:
   at least one of a sensor system or a communication system for identifying a position or positions of one or more external objects in relation to the host vehicle H within a predefined distance; and
   processing means for generating a plurality of trajectories that are valid for enabling the host vehicle H to pass any desired number of the one or more external objects, removing any trajectories intersecting with any one of the one or more external objects, estimating lateral position, lateral velocity, lateral acceleration and lateral jerk that will act on the host vehicle H driving along any one of the trajectories, and selecting the trajectory for which the lateral jerk acting on the host vehicle H is minimized;
   wherein the trajectory comprises n spline segments of degree d, and the n spline segment are divided by spline breakpoints, the spline breakpoints selected independently from the position of the external objects by the processing means such that at an estimated total amount of lateral jerk that would act on the host vehicle H is minimized.

8. The arrangement for determining a trajectory according to claim 7 wherein a safety distance is preselected between any external objects and the host vehicle H when selecting the trajectory.

9. The arrangement for determining a trajectory according to claim 8 wherein the selected trajectory forms a tangent to a first point located at a preselected safety distance from a first external object.

10. The arrangement for determining a trajectory according to claim 8 wherein the selected trajectory forms a tangent to a first point located at a first preselected safety distance from a first external object and at least another point located at a second preselected safety distance from at least another external object.

11. The arrangement for determining a trajectory according to claim 7 wherein the trajectory is constituted of n polynomial spline segments of degree d, and that the n spline segments are divided by spline breakpoints.

12. The arrangement for determining a trajectory according to claim 7 wherein the spline breakpoints are selected such that an estimated maximum jerk, $J_{max}$, for each spline segment is substantially equal.

* * * * *

UNITED STATES PATENT AND TRADEMARK OFFICE
CERTIFICATE OF CORRECTION

PATENT NO. : 9,489,847 B2  
APPLICATION NO. : 14/153509  
DATED : November 8, 2016  
INVENTOR(S) : Andreas Eidehall et al.

Page 1 of 1

It is certified that error appears in the above-identified patent and that said Letters Patent is hereby corrected as shown below:

In the Claims

Column 10, Line 34, Claim 7:  
After "the n spline"  
Delete "segment" and  
Insert -- segments --.

Signed and Sealed this  
Twenty-first Day of February, 2017

Michelle K. Lee  
*Director of the United States Patent and Trademark Office*